(12) United States Patent
Kang

(10) Patent No.: US 8,959,254 B2
(45) Date of Patent: Feb. 17, 2015

(54) IMAGE FORMING APPARATUS AND HOST COMPUTER CAPABLE OF SHARING TERMINOLOGY, METHOD OF SHARING TERMINOLOGY AND TERMINOLOGY SHARING SYSTEM

(75) Inventor: Hyung-jong Kang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1087 days.

(21) Appl. No.: 11/218,767

(22) Filed: Sep. 6, 2005

(65) Prior Publication Data

US 2006/0064514 A1    Mar. 23, 2006

(30) Foreign Application Priority Data

Sep. 22, 2004  (KR) .......................... 10-2004-0075812

(51) Int. Cl.
*G06F 3/00*      (2006.01)
*G06F 9/44*      (2006.01)

(52) U.S. Cl.
CPC ............ *G06F 9/4443* (2013.01); *G06F 9/4448* (2013.01)
USPC .............................................. 710/14; 710/16

(58) Field of Classification Search
USPC .................................................... 710/14, 12
See application file for complete search history.

(56) References Cited

U.S. PATENT DOCUMENTS

| | | | | |
|---|---|---|---|---|
| 4,914,568 A | * | 4/1990 | Kodosky et al. ............... | 715/763 |
| 5,120,230 A | * | 6/1992 | Clark et al. ................ | 434/307 R |
| 5,907,410 A | * | 5/1999 | Ohtake .......................... | 358/468 |
| 6,020,881 A | * | 2/2000 | Naughton et al. ............ | 715/740 |
| 6,879,408 B1 | * | 4/2005 | Hori et al. ..................... | 358/1.13 |
| 7,526,568 B1 | * | 4/2009 | Swanton et al. .............. | 709/239 |
| 2002/0035620 A1 | * | 3/2002 | Takahashi et al. ............ | 709/220 |
| 2003/0154071 A1 | * | 8/2003 | Shreve .............................. | 704/9 |
| 2003/0182632 A1 | | 9/2003 | Murdock et al. | |
| 2004/0015343 A1 | | 1/2004 | Nakayama | |
| 2004/0128669 A1 | * | 7/2004 | Furst et al. .................... | 717/178 |
| 2004/0148136 A1 | * | 7/2004 | Sasaki et al. .................. | 702/188 |
| 2004/0158812 A1 | * | 8/2004 | Dye et al. ...................... | 717/105 |

FOREIGN PATENT DOCUMENTS

| | | |
|---|---|---|
| GB | 2375851 | 11/2002 |
| JP | 2000-326601 | 11/2000 |
| JP | 2002-14786 | 1/2002 |
| JP | 2002-187327 | 7/2002 |
| JP | 2002-287923 | 10/2002 |
| WO | WO 01/14963 | 3/2001 |
| WO | WO 02/086713 | 10/2002 |

OTHER PUBLICATIONS

Andrew S. Tanenbaum, "Structured Computer Organization", 1984, Prentice-Hall, 2nd Edition, p. 11.*
European Search Report dated Sep. 21, 2007 issued in EP 05108626.2.

* cited by examiner

*Primary Examiner* — Henry Tsai
*Assistant Examiner* — John Roche
(74) *Attorney, Agent, or Firm* — Staas & Halsey LLP

(57) ABSTRACT

A host apparatus capable of sharing terminology information and a peripheral device, a method of sharing the terminology information, and a terminology information sharing system. The host apparatus includes a communication module to provide a communication interface between the host apparatus and the peripheral device, an information sharing unit to share terminology information related to a plurality of functions of the peripheral device, and a user interface unit to operate the plurality of functions of the peripheral device and to display the shared terminology information related to each of the plurality of functions. Accordingly, the peripheral device and the host apparatus use identical terminology information related to the functions of the peripheral device.

27 Claims, 7 Drawing Sheets

IMAGE FORMING APPARATUS AND HOST COMPUTER CAPABLE OF SHARING TERMINOLOGY, METHOD OF SHARING TERMINOLOGY AND TERMINOLOGY SHARING SYSTEM

CROSS-REFERENCE TO RELATED APPLICATIONS

This application claims the benefit under 35 U.S.C. §112 of Korean Patent Application No. 2004-75812, filed on Sep. 22, 2004, in the Korean Intellectual Property Office, the disclosure of which is incorporated herein in its entirety by reference.

BACKGROUND OF THE INVENTION

1. Field of the Invention

The present general inventive concept relates to a host computer and a peripheral device capable of sharing terminology information, a method of sharing terminology information, and a terminology information sharing system. More particularly, the present general inventive concept relates to a peripheral device and a host computer to use identical terminology information related to functions of the peripheral device in both of the peripheral device and the host computer, a method of sharing the terminology information, and a terminology information sharing system.

2. Description of the Related Art

Generally, a peripheral device, such as an image forming apparatus, processes data transmitted from a host computer according to conditions set by a user. The user uses a user interface (UI) of the host computer or a user interface (UI) of the peripheral device for setting the conditions of the peripheral device.

The UI of the peripheral device is an operating panel (OPE) and the operating panel includes a plurality of keys, buttons, a touch panel and a liquid crystal display (LCD). The user uses the UI of the peripheral device for setting various conditions of the peripheral device, such as the pages to be printed, degrees of brightness and resolution and density of a copy.

Also, the UI of the host computer is another operating panel of the peripheral device displayed at a display of the host computer. That is, the UI of the host computer has the same function as the operating panel of the peripheral device and it is graphically displayed at the display of the host computer. The UI of the host computer is provided by an application program. The user also sets various conditions of the peripheral device by using the UI of the host computer.

Meanwhile, a plurality of functions are defined using predetermined terminologies and the predetermined terminologies are displayed in the UI of the peripheral device and the UI of the host computer for representing corresponding functions of the peripheral device. The predetermined terminologies are generally translated to a language of a country where the peripheral device is sold. For example, in a case in which the peripheral device is sold in countries where English is a main language, the defined terminologies are translated as English terminologies. If the peripheral device is sold for countries using German as a main language, the defined terminologies are translated as German terminologies.

Conventionally, an identical function of the peripheral device may be defined using different terminologies in the UI of the peripheral device and the UI of the host computer. For example, a function for controlling the resolution is defined as "resolution" in the UI of the peripheral device, but it is defined as "printing/copying quality" in the UI of the host computer.

Also, the defined terminologies may not be translated as the same words when the defined terminologies are translated to other languages. Therefore, a user of the host computer and the peripheral device may be confused by differently defined terminologies and differently translated terminologies for identical functions.

Furthermore, defining the terminologies of the functions is individually performed in the host computer and the peripheral device. Therefore, the peripheral device and the host computer doubly perform the same operations for defining the terminologies of the functions individually.

SUMMARY OF THE INVENTION

Accordingly, the present general inventive concept provides a peripheral device and a host computer capable of sharing terminology to use identical terminology information related to functions of the peripheral device in both of the peripheral device and the host computer, a method of sharing a terminology and a terminology sharing system.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a host apparatus capable of sharing terminology information, including a communication module to provide a communication interface between the host apparatus and a peripheral device, an information sharing unit to share terminology information related to a plurality of functions of the peripheral device, and a user interface unit to operate the plurality of functions of the peripheral device and to display the shared terminology information according to each of the plurality of functions.

The host apparatus may further include a first controlling unit to request the peripheral device to load the terminology information from the peripheral device to the host apparatus, to control the communication module and the information sharing unit to share the terminology information loaded from the peripheral device, and to control the user interface unit to display the shared terminology information according to each of the plurality of functions.

The peripheral device may request the information sharing unit to load the terminology information stored in the information sharing unit and may share the terminology information by storing the terminology information loaded from the information sharing unit.

The peripheral device may include a communication unit to communicate with the communication module of the host apparatus to provide the communication interface between the host apparatus and the peripheral device, a loading requesting unit to request the information sharing unit to load the terminology information stored in the information sharing unit, a loading storing unit to store the terminology information loaded from the information sharing unit, an operating panel unit to operate the plurality of functions of the peripheral device and to display the terminology information stored in the loading storing unit according to the plurality of functions, and a second controlling unit to control the operating panel unit to display the terminology information to match with corresponding functions.

The peripheral device may include one of a fax, a copier, a multifunctional device and an image forming apparatus.

The foregoing and/or other aspects of the present general inventive concept are also achieved by providing a host apparatus that communicates with a peripheral device which displays an operation menu using predetermined terminology to control operations of the peripheral device, the host apparatus comprising an information sharing unit to load the predetermined terminology from the peripheral device and store the predetermined terminology, and a peripheral device driver unit to display a driver menu using the loaded terminology such that the driver menu uses the same terminology as the operation menu of the peripheral device.

The foregoing and/or other aspects of the present general inventive concept are also achieved by providing a host apparatus that communicates with a peripheral device which displays a menu to control operations of the peripheral device, the host apparatus comprising a storage unit to store predetermined terminology information corresponding to the operations of the peripheral device, a GUI (graphic user interface) generating unit to generate a GUI using the stored terminology information to control the operations of the peripheral device, and an information sharing unit to transmit the stored terminology information to the peripheral device to be used by the peripheral device to display the menu of the peripheral device.

The foregoing and/or other aspects of the present general inventive concept are also achieved by providing an image forming device that communicates with a host apparatus which displays a graphic use interface (GUI) to control the image forming device, the image forming device comprising an image forming unit to form an image, a storage unit to store predetermined terminology information corresponding to settings of the image forming unit therein, an operating panel unit to display a menu using the predetermined terminology information to control the image forming unit, and an information sharing unit to transmit the predetermined terminology information to the host apparatus to be used by the host apparatus to display the GUI of the host apparatus.

The forgoing and/or other aspects of the present general inventive concept are also achieved by providing an image forming device that communicates with a host apparatus which displays a driver menu using predetermined terminology corresponding to settings of the image forming device to drive the image forming device, the image forming device comprising an image forming unit to form an image, an information sharing unit to load the predetermined terminology from the host apparatus and to store the loaded terminology, and an operating panel unit to generate and display an operation menu using the loaded predetermined terminology to control the image forming unit such that the operation menu uses the same terminology as the driver menu of the host apparatus.

The foregoing and/or other aspects of the present general inventive concept are also achieved by providing a method of sharing terminology information, including sharing terminology information related to a plurality of functions of a peripheral device with the peripheral device, generating a user interface displaying the shared terminology information according to the plurality of functions when displaying of the shared terminology information is requested, selecting one of the plurality of functions using the terminology information displayed in the user interface, and requesting the peripheral device to perform the selected function.

The foregoing and/or other aspects of the present general inventive concept are also achieved by providing a method of controlling a peripheral device in a system including a host apparatus communicating with the peripheral device, the method comprising storing terminology information corresponding to operations of the peripheral device in one of the peripheral device and the host apparatus, transmitting the terminology information stored in the one of the peripheral device and the host apparatus to the other one thereof, displaying first and second menus in the peripheral device and the host apparatus, respectively, using the transmitted terminology information, and controlling the operations of the peripheral device using one of the displayed first and second menus.

The sharing of the terminology information may include requesting the peripheral device to load the terminology information from the peripheral device and storing the terminology information loaded from the peripheral device.

The sharing of the terminology information may include loading stored terminology information to the peripheral device to share the terminology information in response to a request from the peripheral device.

The foregoing and/or other aspects of the present general inventive concept are also achieved by providing a terminology information sharing system, including a peripheral device having an operating panel unit to display terminology information related to functions of the peripheral device to operate the functions, a host computer to provide a graphic user interface identical to the operating panel unit by using terminology information related to the functions displayed at the operating panel unit, and a terminology information server to load the terminology information related to the functions to one of the peripheral device and the host computer, when one of the peripheral device and the host computer request the terminology information server to load the terminology information.

The peripheral device and the host computer may store the terminology information loaded from the terminology information server as a file. The peripheral device may display the stored terminology information according to corresponding functions at the operating panel unit after the terminology information is stored and the host computer may generate the graphic user interface to display the terminology information identical to the terminology information displayed at the operating panel unit according to the functions.

The peripheral device and the host computer may request the terminology information server to load terminology information expressed as a language of a country where the peripheral device is used.

The foregoing and/or other aspects of the present general inventive concept are also achieved by providing a terminology information sharing system, comprising a peripheral device having one or more predetermined functions to store terminology information corresponding to the predetermined functions and to display an operational menu using the stored terminology information to control the predetermined functions, and a host apparatus communicating with the peripheral device to load the terminology information from the peripheral device and to display a driver menu using the loaded terminology information to control the predetermined functions of the peripheral device, such that the driver menu uses the same terminology information as the operational menu of the peripheral device.

The foregoing and/or other aspects of the present general inventive concept are also achieved by providing a terminology information sharing system, comprising a peripheral device to display a menu using first terminology information to control operations of the peripheral device, a host apparatus communicating with to display a graphic user interface (GUI) using second terminology information to control the operations of the peripheral device, and an information sharing unit communicating with the host apparatus and the peripheral device to store shared terminology information therein and to transmit the shared terminology information to the peripheral device and the host apparatus to be used as the first and second terminology information to display the menu and the GUI, respectively.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
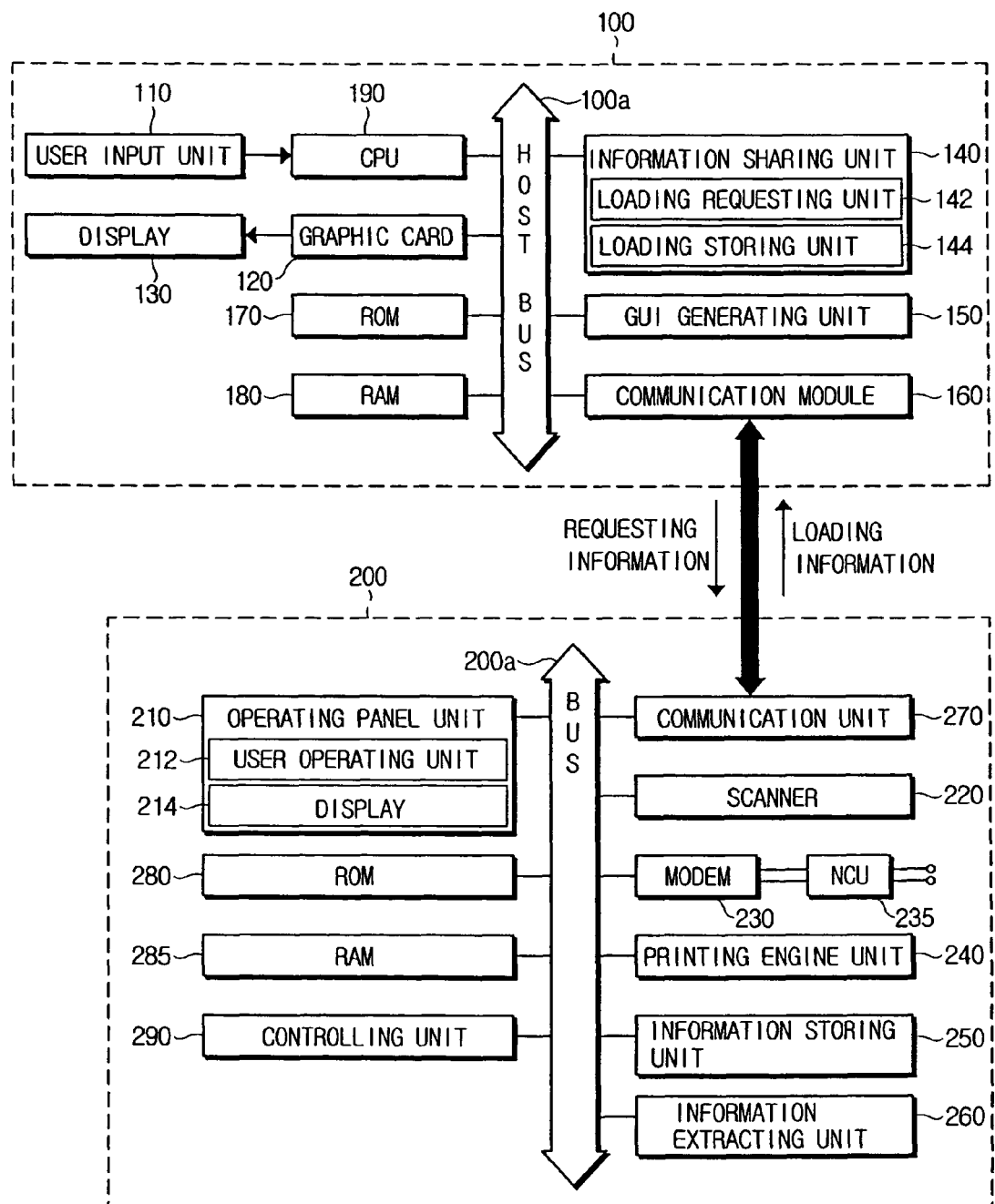
FIG. 1 is a diagram illustrating a host apparatus and a peripheral device connected to the host apparatus capable of sharing terminology information according to an embodiment of the present general inventive concept.

In the following description, like drawing reference numerals are used for like elements even in different drawings. The matters defined in the description such as a detailed construction and elements are nothing but the ones provided to assist in a comprehensive understanding of the general inventive concept. Thus, it is apparent that the present general inventive concept can be carried out without those defined matters. Also, well-known functions or constructions are not described in detail since they would obscure the general inventive concept in unnecessary detail.

FIG. 1 is a diagram a host apparatus 100 and a peripheral device 200 connected to the host apparatus 100 capable of sharing terminology information according to an embodiment of the present general inventive concept.

In the embodiment of FIG. 1, the host apparatus 100 provides a function identical to that of an operating panel unit 210 of the peripheral device 200, and the peripheral device 200 is a device having a function to form an image on a paper.

The host apparatus 100 of the present embodiment may be embodied as a host computer having a driver to drive the peripheral device 200, and the peripheral device 200 may be a multi-functional device, such as an image forming apparatus capable of printing, copying and faxing.

Referring to FIG. 1, the host apparatus 100 includes a user input unit 110, a graphic card 120, a display 130, an information sharing unit 140, a GUI generating unit 150, a communication module 160, a read only memory (ROM) 170, a random access memory (RAM) 180, and a central processing unit (CPU) 190. The host apparatus also includes a host bus 100a to transmit and receive data between the above-mentioned functional blocks of the host apparatus 100.

The user input unit 110 is a user interface (UI) to input requests to perform functions of the host apparatus 100. A keyboard, a mouse, a touch panel, and the like can be used as the user input unit 110. In the present embodiment, the user input unit 110 outputs a signal to the CPU 190 to request displaying of a graphic user interface (GUI).

The GUI is a user interface to request the peripheral device 200 to perform predetermined operations of the peripheral device 200, such as printing, faxing and copying. The GUI of the host apparatus 100 is designed to provide functions identical to the operating panel unit 210 of the peripheral device 200. Accordingly, a user can control the peripheral device 200 to perform any of the predetermined operations by using the GUI of the host apparatus 100. The user can also set operational conditions of the peripheral device 200 by controlling initial values of menus related to the operations of the peripheral device 200 in the GUI of the host apparatus 100.

In response to the signal output from the user input unit 110, the CPU 190 controls the GUI generating unit 150 to generate the GUI. The graphic card 120 converts the GUI generated by the GUI generating unit 150 to a signal that is displayable on the display 130 of the host apparatus 100. The graphic card 120 outputs the generated signal to the display 130 to display the GUI thereon.

The display 130 is a device to display the GUI generated by the GUI generating unit 150 by displaying the signal generated by the graphic card 120. The display 130 may be a cathode ray tube monitor or a liquid crystal display (LCD) monitor, but is not limited thereto.

The information sharing unit 140 loads terminology information related to various functions of the peripheral device 200 from the peripheral device 200. The host apparatus 100 shares identical terminologies with the peripheral device 200 using the information sharing unit 140. The functions of the peripheral device 200 are defined as terminologies in the peripheral device 200 and the defined terminologies are displayed on the GUI of the host apparatus 100 and the operating panel unit 210 of the peripheral device 200 to represent related functions of the peripheral device 200. The terminology information loaded by the information sharing unit 140 from the peripheral device 200 includes the defined terminologies representing the related functions of the peripheral device 200 and information to explain the defined terminologies. That is, the information sharing unit 140 loads the terminology information from the peripheral device 200 to the host apparatus 100 such that the GUI of the host apparatus 100 displays the same defined terminologies representing the functions of the peripheral device 200 as the operating panel unit 210 of the peripheral device 200. The information sharing unit 140 can be embodied as an application program to load the defined terminologies.

The information sharing unit 140 can include a loading requesting unit 142 and a loading storing unit 144.

The loading requesting unit 142 requests the peripheral device 200 to load the terminology information related to the functions of the peripheral device 200 from the peripheral device 200. The terminology information includes the defined terminologies corresponding to the functions of the peripheral device 200 and the information to explain the defined terminologies. The information to explain the defined terminologies can include indexes assigned to the defined terminologies corresponding to positions of the defined terminologies in the GUI.

The loading storing unit 144 stores the loaded terminology information including the defined terminologies and the indexes assigned thereto as a file.

The GUI generating unit 150 generates the GUI by using the terminology information stored in the loading storing unit 144 when the request to generate the GUI is output from the user input unit 110.

The GUI of the host apparatus 100 can be divided into a plurality of regions, and each of regions is assigned with a unique index. The indexes assigned to the defined terminologies to correspond to the indexes of the regions of the GUI. Accordingly, the GUI generating unit 150 compares the indexes of the regions and the indexes of the defined terminologies and generates the GUI to display the defined terminologies at corresponding regions of the GUI. Accordingly, the GUI generating unit 150 can generate the GUI to display the defined terminologies identically to the operating panel unit 210 of the peripheral device 200. The GUI generating unit 150 can generate the GUI to be identical to an initial state of the operating panel unit 210.

Figure 2A:
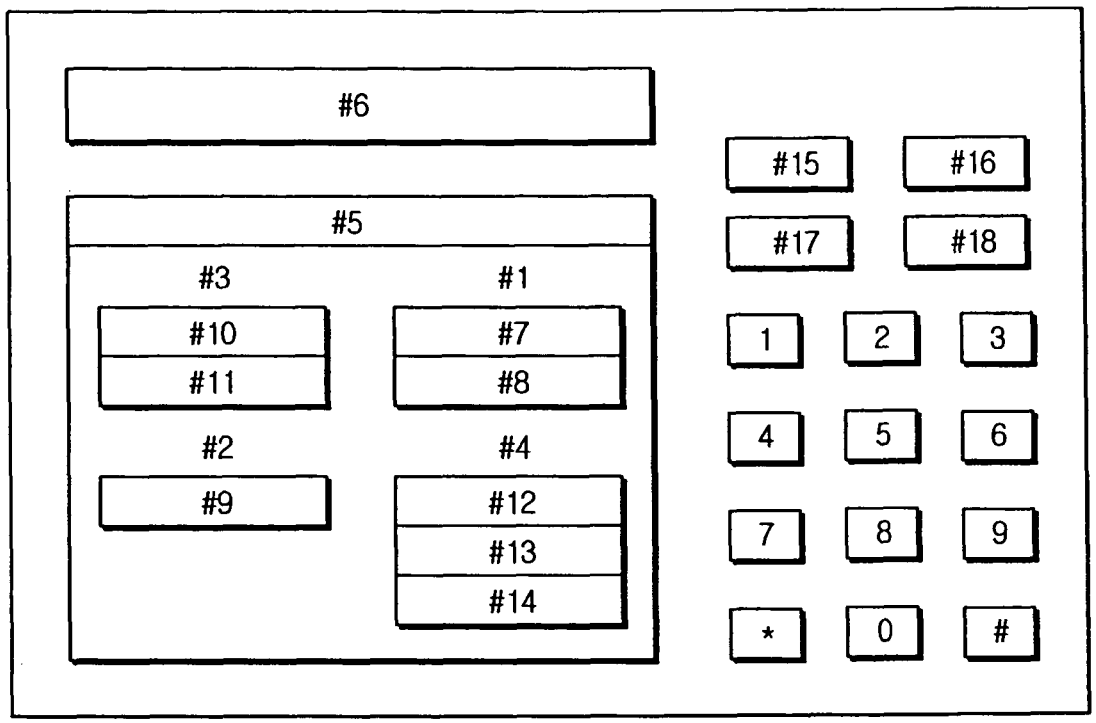
FIG. 2A is a diagram illustrating a GUI assigned with indexes.
Figure 2B:
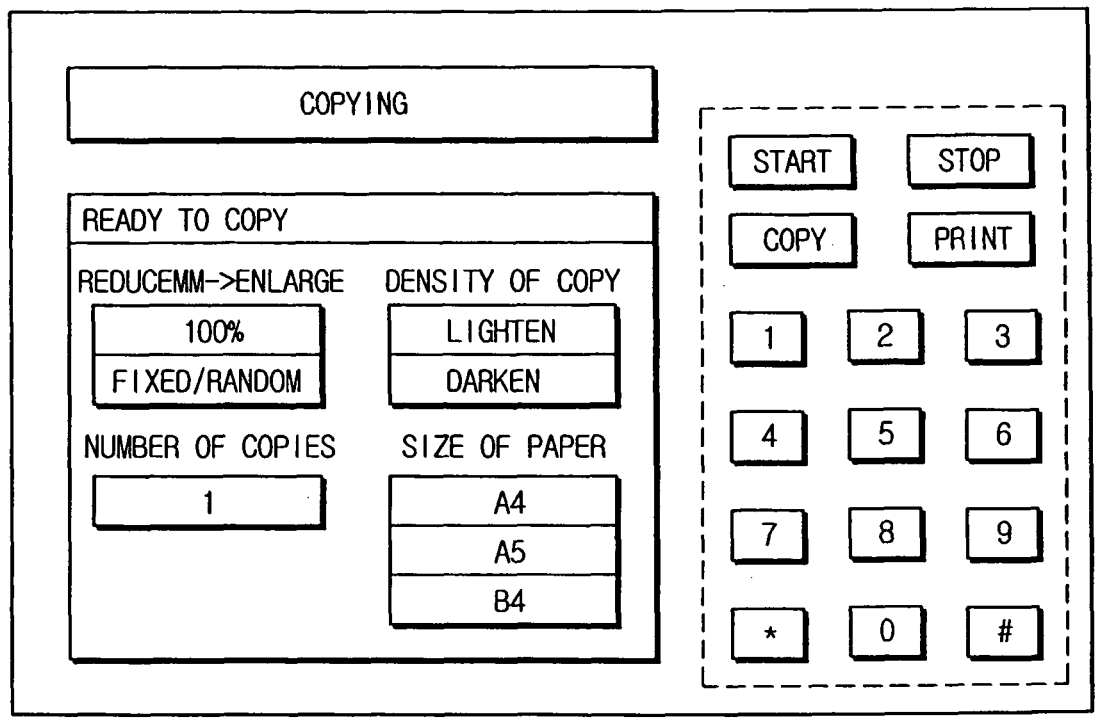
FIG. 2B is a diagram illustrating an initial GUI generated by a GUI generating unit of the host apparatus of FIG. 1 according to an embodiment of the present general inventive concept.

FIG. 2A is diagram illustrating the GUI divided into a plurality of regions with unique indexes assigned thereto, and FIG. 2B is a diagram illustrating an initial GUI generated by the GUI generating unit 150 of FIG. 1 according to an embodiment of the present general inventive concept.

As illustrated in FIG. 2A, each region of the GUI is assigned with indexes such as #1, #2, . . . , #18. The GUI generating unit 150 generates the GUI to display the terminology assigned with index #1 to the region assigned index #1 and the terminology assigned with index #2 to the region assigned index #2. The identical operation is applied to regions with index #3 to index #n. Accordingly, the GUI generating unit 150 generates the GUI, such as for example, the GUI illustrated in FIG. 2B.

The communication module 160 performs data communication with at least one peripheral device 200 through an external communication network, such as the Internet or a local area network (LAN). The communication module 160 transmits a request signal from the information sharing unit 140 to the peripheral device 200 to load the terminology information at the host apparatus 100, and receives the terminology information from the peripheral device 200. The communication module 160 can use a local area network (LAN) card or a network interface card to communicate with the peripheral device 200.

The ROM 170 is a nonvolatile memory and stores various controlling programs to perform functions of the host apparatus 100. The RAM 180 is a volatile memory element. The RAM 180 loads a program to be executed by the CPU 190 which is stored in the ROM 170 and stores data processed by the CPU 190.

The CPU 190 controls general operations of the host apparatus 100 by using the controlling programs stored in the ROM 170. In the present embodiment, the CPU 190 controls the GUI generating unit 150 to generate the GUI displaying the defined terminologies loaded from the peripheral device 200 when the user input unit 110 requests displaying of the GUI.

The graphic card 120 processes the generated GUI to display the GUI on the display 130. The display 130 of the host apparatus 100 displays the GUI having the defined terminologies arranged identically to the operating panel 210 of the peripheral device 200, and the user can control functions of the peripheral device 200 by using the GUI displayed on the display 130 of the host apparatus 100.

Figure 3:
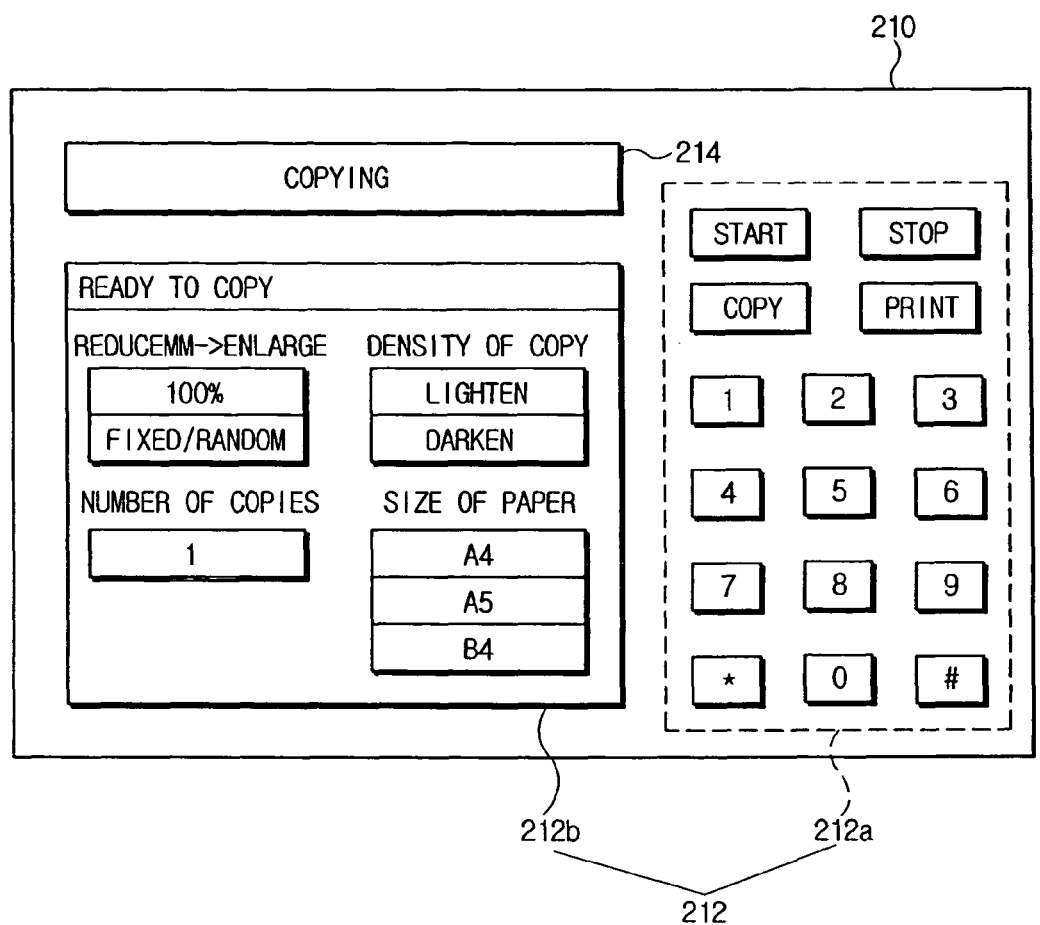
FIG. 3 is a view illustrating an operating panel of a peripheral device of FIG. 1 according to an embodiment of the present general inventive concept.

FIG. 3 is a diagram illustrating the operating panel unit 210 of the peripheral device 200 of FIG. 1 according to an embodiment of the present general inventive concept.

Referring to FIGS. 1 and 3, the peripheral device 200 includes an operating panel unit 210, a scanner 220, a MODEM 230, a network control unit (NCU) 235, a printing engine unit 240, an information storing unit 250, an information extracting unit 260, a communication unit 270, a ROM 280, a RAM 285 and a controlling unit 290. The peripheral device 200 also includes a bus 200a to transmit and receive data between the above mentioned functional blocks of the peripheral device 200.

The operating panel unit 210 can include a user operating unit 212 and a display 214 as illustrated in FIG. 3. The user operating unit 212 is a user interface to output a signal to the controlling unit 290 to operate various functions of the peripheral device 200. Accordingly, the user operating unit 212 includes various function keys 212a and the touch screen 212b to input texts, numbers and directions to control the peripheral device 200.

The display 214 displays operating states of the peripheral device 200 by using predetermined characters and symbols according to control of the controlling unit 290. The display 214 can be embodied as a liquid crystal display (LCD). The display 130 displays the terminology information related to the functions of the peripheral device 200.

When the peripheral device 200 is turned on, the touch screen 212b and the display 214 can display the terminology information as illustrated in FIG. 3. When one of the functions of the peripheral device is selected or operated by the user, the touch screen 212b and the display 214 displays corresponding terminology information related to the selected function. That is, the controlling unit 290 reads the terminology information corresponding to the selected function from the information storing unit 250 and controls the operating panel unit 210 to display the read terminology information.

For example, if the user selects a function to control a number of copies, "Number of Copy" is displayed on the touch screen 212b, and if the user selects a function to control a size of document, "reduce→enlarge" is displayed on the touch screen 212b. If a function to control a density of a copy is selected, "density of copy" is displayed on the touch screen 212b. Also, the display 130 can display terminology information such as "ready to copy."

The scanner 220 reads image data from a document. The read image data is stored in the RAM 180 or printed by the printing engine unit 240 according to a control of the controlling unit 290.

The MODEM 230 modulates data to be transmitted to an external fax (not shown) or demodulates data received from the external fax. The NCU 235 controls access to the external fax (not shown) by connecting a public switched telephone network (PSTN) to the MODEM 230, and detects receiving and transmitting of a dial signal from and to the external fax.

The printing engine 240 prints data from the host apparatus 100, scanned data or data received from the external fax through the NCU 245.

The information storing unit 250 stores the terminology information related to the functions of the peripheral device 200. The terminology information includes terminologies defined according to the functions of the peripheral device 200 and information explaining the defined terminologies.

The terminology information can be stored as a look-up table in the information storing unit 250. Table 1 below illustrates the terminology information stored as the look-up table in the information storing unit 250.

TABLE 1

| INDEX | FUNCTION | TERMINOLOGY |
|---|---|---|
| INDEX 1(#1) | Controlling a density of a copy | Density of copy |
| INDEX 2(#2) | Setting the number of copies | Number of copies |
| INDEX 3(#3) | Controlling a size of a copy | Reduce –> enlarge |
| . | . | . |
| . | . | . |
| . | . | . |
| INDEX n(#n) | Controlling a size of a printing paper | Size of paper |

Referring to Table. 1, each defined terminology and corresponding function is assigned with a unique index. The indexes of the functions and the terminologies are used by the GUI generating unit 150 of the host apparatus 100 to generate the GUI, such as the GUI illustrated in FIG. 2B, when the host apparatus 100 loads the stored terminology information.

The information extracting unit 260 extracts the terminology information stored in the information storing unit 250, including the assigned indexes, when the host apparatus 100 requests the peripheral device 200 to load the terminology information from the peripheral device 200.

The communication unit 270 communicates with the communication module 160 of the host apparatus 100 to communicate between the host apparatus 100 and the peripheral device 200. The communication unit 270 receives a request signal to load the terminology information from the host apparatus 100 and transfers the received request signal to the controlling unit 290. The communication unit 270 then transmits the extracted terminology information from the information extracting unit 260 to the host apparatus 100 according to a control of the controlling unit 290.

The ROM 280 is a memory to store various controlling programs to perform the functions of the peripheral device 200. The RAM 285 is a memory to store data generated during operating the peripheral device 200.

The controlling unit 290 controls general operations of the peripheral device 200 according to the controlling programs stored in the ROM 280. In the present embodiment, the controlling unit 290 controls the information extracting unit 260 and the communication unit 270 to extract the terminology information from the information storing unit 250 and to transfer the extracted terminology information to the host apparatus 100 when the host apparatus 100 requests loading of the terminology information.

Figure 4:
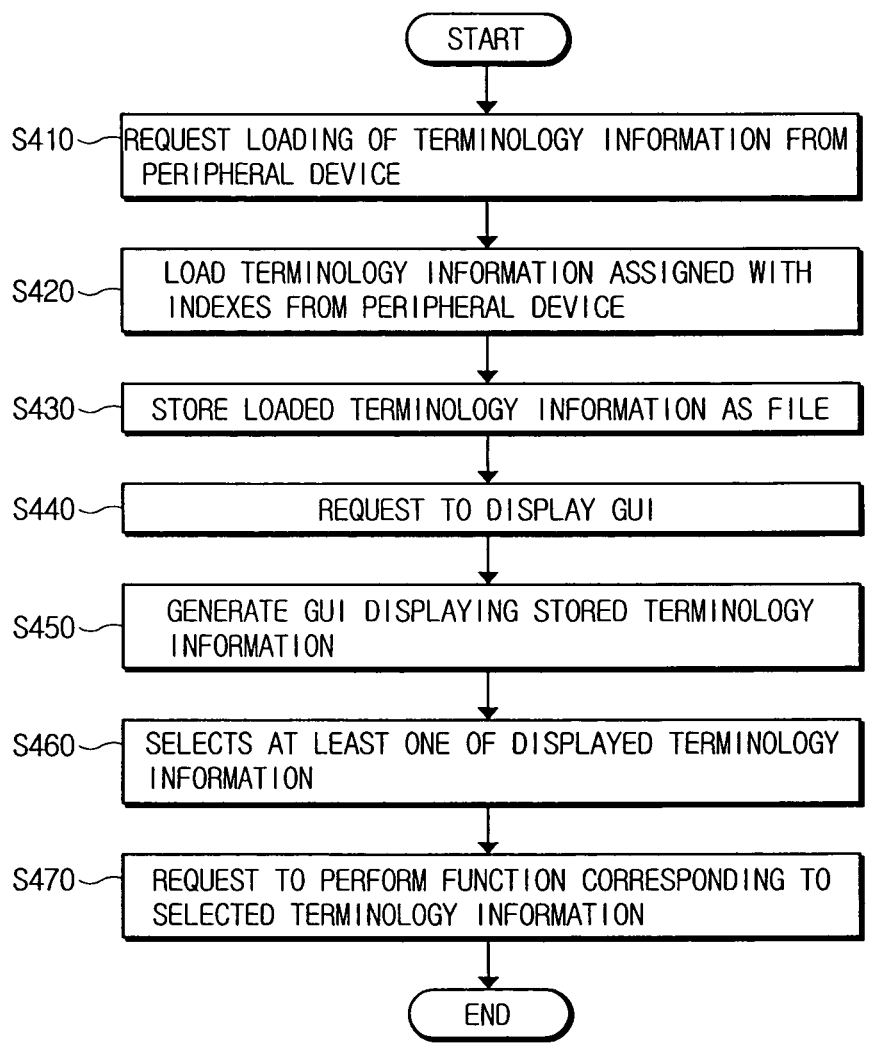
FIG. 4 is a flowchart illustrating a method of sharing terminology information using the host apparatus and the peripheral device of FIG. 1 according to an embodiment of the present general inventive concept.

FIG. 4 is a flowchart illustrating a method of sharing terminology using the host apparatus 100 and the peripheral device 200 of FIG. 1 according to an embodiment of the present general inventive concept.

Referring to FIGS. 1 and 4, when a program to load the terminology information is executed by a user, the loading requesting unit 142 outputs a signal to the peripheral device 200 to request loading of the terminology information from the peripheral device 200 at operation S410. The terminology information is then loaded from the peripheral device 200 to the host apparatus 100 at operation S420. That is, the communication unit 270 of the peripheral device 200 transfers the terminology information including the assigned indexes to the communication module 160 of the host apparatus 100.

When the terminology information is loaded to the host apparatus 100 from the peripheral device 200, the loading storing unit 144 stores the loaded terminology information including the assigned indexes as a file at operation S430. Accordingly, the host apparatus 100 and the peripheral device 200 share the identical terminology information representing the functions of the peripheral device 200.

Next, the user input unit 110 inputs a request to display the GUI to set the functions or operations of the peripheral device 200 at S440. The GUI generating unit 150 then generates the GUI displaying the terminology information stored in the loading storing unit 144 as illustrated in FIG. 2B at operation S450.

Accordingly, the defined terminologies representing the functions of the peripheral device 200 are displayed in regions of the GUI corresponding to the assigned indexes, as illustrated in FIG. 2B. The user can then select at least one of the functions of the peripheral device 200 by selecting corresponding defined terminology displayed at the GUI using the user input unit 110 at operation S460. When at least one of the functions is selected, the communication module 160 requests the peripheral device 200 to perform the selected function at operation S470.

As described above, the host apparatus 100 displays the GUI using identical terminologies to those used by the operating panel unit 210 of the peripheral device 200 and the user can control or perform the functions of the peripheral device 200 by using the GUI of the host apparatus 100. That is, the user can request the peripheral device 200 to perform one of the functions by selecting the corresponding terminology displayed in the GUI of the host apparatus 100.

Figure 5:
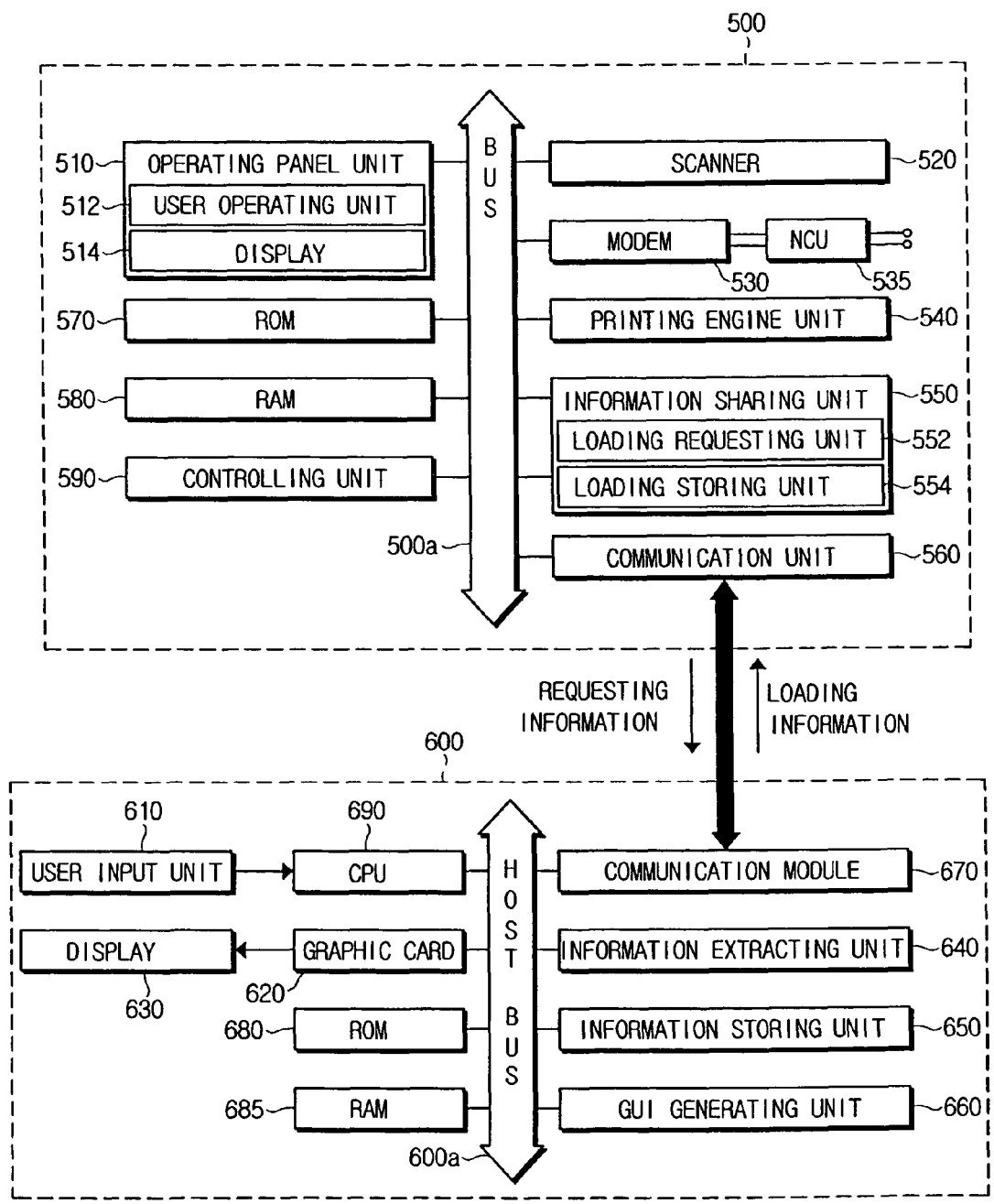
FIG. 5 is a diagram illustrating a host apparatus and a peripheral device connected to the host apparatus capable of sharing terminology information according to another embodiment of the present general inventive concept.

FIG. 5 is a diagram illustrating a peripheral device 500 capable of sharing terminology information and a host apparatus 600 connected to the peripheral device 500 according to another embodiment of the present general inventive concept.

According to the embodiment of FIG. 5, a peripheral device 500 capable of sharing information loads terminology information from the host apparatus 600 and displays the loaded terminology information at an operating panel unit 510. Also, the host apparatus 600 generates a GUI using the terminology information to control the peripheral device 500. Therefore, the peripheral device 500 and the host apparatus 600 display identical terminology information.

In the embodiment of FIG. 5, the peripheral device 500 may be a multi-functional device, such as an image forming apparatus capable of printing, scanning and faxing, and the host apparatus 600 may be a host computer having a driver to drive the peripheral device 500.

Referring to FIG. 5, the peripheral device 500 capable of sharing the terminology information includes the operating panel unit 510, a scanner 520, a MODEM 530, an NCU 535, a printing engine unit 540, an information sharing unit 550, a communication unit 560, a ROM 570, a RAM 580 and a controlling unit 590. The operating panel unit 510 includes a user operating unit 512 and a display 514. Also, the information sharing unit 550 can include a loading requesting unit 552 and a loading storing unit 554. The peripheral device also includes a bus 500a to transmit and receive data between the above mentioned function blocks of the peripheral device 500.

The operating panel unit 510, the user operating unit 512, the display 514, the scanner 520, the MODEM 530, the NCU 535, the printing engine unit 540, the ROM 570 and the RAM 580 of the peripheral device 500 of FIG. 5 are similar to the operating panel unit 210, the user operating unit 212, the display 214, the scanner 220, the MODEM 230, the NCU 235, the printing engine unit 240, the ROM 270 and the RAM 280 of the peripheral device 200 of FIG. 1, respectively.

Therefore, detailed explanations thereof are omitted.

When the peripheral device 500 is turned on, a touch screen (not shown) and the display 514 of the operating panel unit 510 displays terminology information of corresponding functions. The terminology information displayed on the touch screen (not shown) and the display 514 is changed whenever the user selects terminology information to perform one of the functions of the peripheral device 500, or whenever one of the functions is performed.

The information sharing unit 550 loads the terminology information related to the functions of the peripheral device 500 from the host apparatus 600. The information sharing unit 550 can be embodied as an information sharing program. By loading the terminology information from the host apparatus 600, the host apparatus 600 and the peripheral device 500 share identical terminology information and display the identical terminology information to control the functions of the peripheral device 500.

The information sharing unit 550 can include the loading requesting unit 552 and the loading storing unit 554.

When a user executes the information sharing program, the loading requesting unit 552 requests the host apparatus 600 to load the terminology information related to the functions of the peripheral device 500. The terminology information includes terminologies defined according to each function of the peripheral device and information to explain the defined terminologies. The information to explain the defined terminologies can include indexes assigned to the defined terminologies corresponding to a position to display the defined terminologies on the operating panel unit 510.

The loading storing unit 554 stores the terminology information including the assigned indexes loaded from the host apparatus 600 as a file.

The communication unit 560 communicates with at least one host apparatus 600 through an Internet or a local area network (LAN). The communication unit 560 transmits a loading request signal to request loading from the loading request unit 552 to the host apparatus 600. The communication unit 560 also receives the terminology information from the host apparatus 600 and outputs the received terminology information to the loading storing unit 554.

When the loading requesting unit 552 requests loading of the terminology information, the controlling unit 590 controls the communication unit 560 to transmit the loading requesting signal to the host apparatus 600. When the terminology information including the assigned indexes is loaded from the host apparatus 600, the controlling unit 590 generates a file including the terminology information with the assigned indexes, and controls the loading storing unit 554 to store the generated file.

The controlling unit 590 controls the operating panel unit 510 to display the defined terminologies stored in the loading storing unit 554 at regions of the touch screen (not shown) and the display 514 corresponding to the indexes assigned to the defined terminologies stored in the loading storing unit 554.

The host apparatus 600 includes a user input unit 610, a graphic card 620, a display 630, an information extracting unit 640, an information storing unit 650, a GUI generating unit 660, a communication module 670, a ROM 680, a RAM 685 and a CPU 690. The host apparatus 600 also includes a host bus 600a to transmit and receive data between the above mentioned functional blocks of the host apparatus 600.

The user input unit 610, the graphic card 620, the display 630, the GUI generating unit 660, the ROM 680 and the RAM 685 of the host apparatus of FIG. 5 are similar to the user input unit 110, the graphic card 120, the display 130, the ROM 170 and the RAM 180 of the host apparatus 100 of FIG. 1, respectively. Therefore, detailed explanations thereof are omitted.

The GUI generating unit 660 generates a GUI using terminology information stored in the information storing unit 650 when the user requests to display the GUI using the user input unit 610. The GUI generating unit 660 generates the GUI similarly to the GUI generating unit 150 of FIG. 1, as described above with reference to FIGS. 2A and 2B. Therefore, a detailed explanation thereof is omitted.

The terminology information displayed at the GUI is identical to terminology information displayed at the operating panel unit 510.

The information storing unit 650 can store the terminology information related to the functions of the peripheral device 500 as a look-up table, such as the table illustrated in Table 1. Referring back to Table 1, a unique index is assigned to each defined terminology and corresponding function. The assigned indexes are used to display the terminology information at corresponding regions in the GUI of the host apparatus 600 and at corresponding regions in the touch screen (not shown) and the display 514 of the peripheral device 500.

The information extracting unit 640 extracts the terminology information including the assigned indexes stored in the information storing unit 650 when the peripheral device 500 requests the host apparatus 600 to load the terminology information.

The communication module 670 communicates with the peripheral device 500 through an external communication network, such as an Internet or a local area network (LAN). When the communication module 670 receives the loading request signal from the peripheral device 500, the communication module 670 transfers the loading request signal to the CPU 690. The communication module 670 then transmits the terminology information extracted by the information extracting unit 640 to the peripheral device 500. The communication module 670 can use a local area network (LAN) card or a network interface card to transmit and receive data between the host apparatus 600 and the peripheral device 500.

The CPU 690 controls operations of the host apparatus 600 by using controlling programs stored in the ROM 680. In the present embodiment, the CPU 690 controls the GUI generating unit 660 to generate the GUI using the terminology information stored in the information storing unit 650 when the user input unit 610 requests displaying of the GUI.

The CPU 690 also controls the information extracting unit 640 and the communication module 670 to extract the terminology information including the assigned indexes from the information storing unit 650 and to transmit the extracted terminology information including the assigned indexes to the peripheral device 500.

Accordingly, the user can set and request a plurality of functions of the peripheral device 500, using the operating panel unit 510 of the peripheral device 500 which displays identical terminology information as the GUI of the host apparatus 600.

Figure 6:
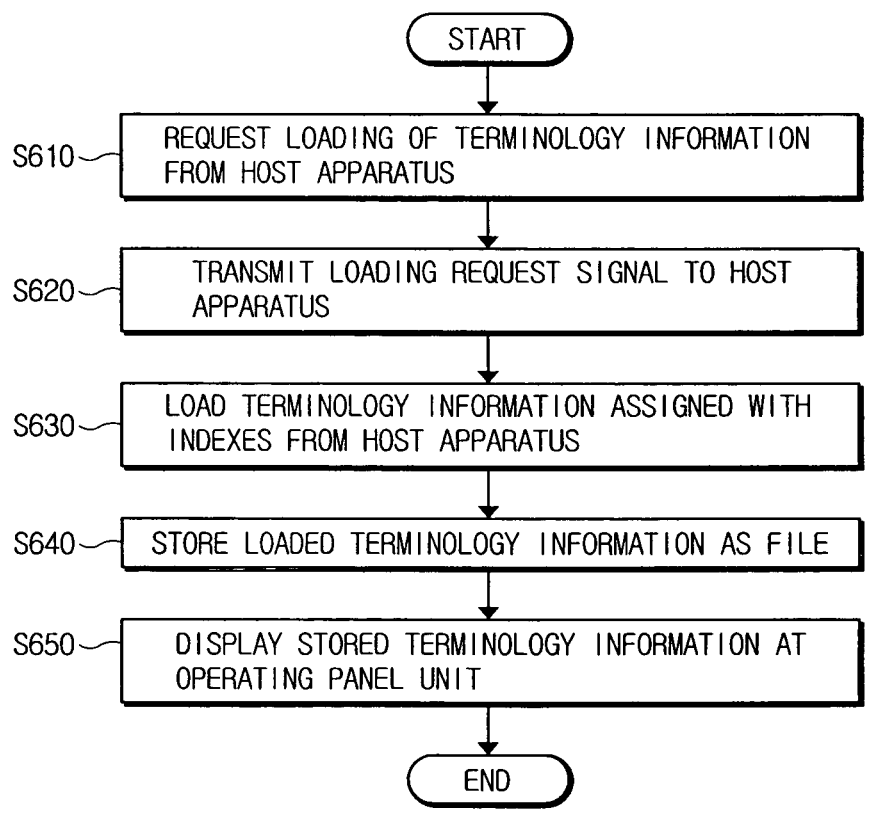
FIG. 6 is a flowchart illustrating a method of sharing terminology information using the host apparatus and the peripheral device of FIG. 5 according to another embodiment of the present general inventive concept.

FIG. 6 is a flowchart illustrating a method of sharing terminology information using the peripheral device 500 and the host apparatus 600 of FIG. 5 according to another embodiment of the present general inventive concept.

Referring to FIGS. 5 and 6, when the user executes a program to load terminology information, the loading requesting unit 552 outputs the loading requesting signal to request loading of the terminology information related to the functions of the peripheral device to the peripheral device 500 at operation S610.

The controlling unit 590 then controls the communication unit 560 to transmit the loading requesting signal output from the loading requesting unit 552 to the host apparatus 600 at operation S620. The terminology information is then loaded from the host apparatus 600 to the peripheral device 500 at operation S630. That is, the communication module 670 of the host apparatus 600 transfers the terminology information including the assigned indexes to the communication unit 560 of the peripheral 500.

When the terminology information including the assigned indexes is loaded from the host apparatus 600 to the peripheral device 500 through the communication unit 560, the controlling unit 590 controls the loading storing unit 554 to store the loaded terminology information as a file at operation S640. Accordingly, the peripheral device 500 and the host apparatus 600 share the terminology information related to the functions of the peripheral device 600.

Next, the controlling unit 590 controls the operating panel unit 510 to display the terminology information stored in the loading storing unit 554 at regions of the operating panel unit 510 corresponding to the assigned indexes at operation S650. Accordingly, the operating panel unit 510 of peripheral device 500 and the GUI of the host apparatus 600 respectively display identical terminology information with respect to each of the functions of the peripheral device 600.

Figure 7:
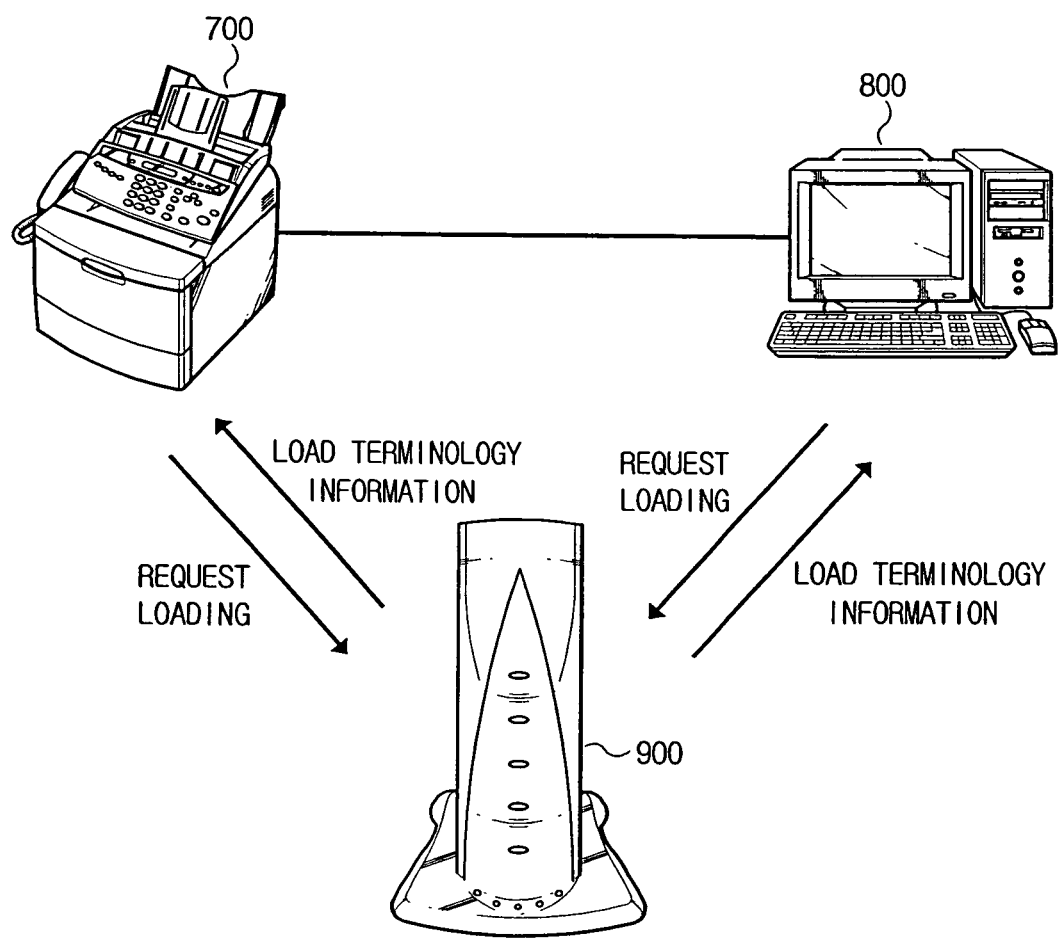
FIG. 7 is a diagram illustrating a terminology information sharing system according to another embodiment of the present general inventive concept.

FIG. 7 is a diagram illustrating a terminology sharing system according to another embodiment of the present general inventive concept.

Referring to FIG. 7, the terminology sharing system includes a peripheral device 700, a host computer 800 and a terminology information server 900. The peripheral device 700, the host computer 800 and the terminology information server 900 can be connected through an Internet or a local area network (LAN) to communicate with each other.

The peripheral device 700 can be a multi-functional device, such as an image forming apparatus having a function of printing image on a paper. The host computer 800 can include a driver to drive the peripheral device 700 and to generate a GUI to provide a function identical to an operating panel unit (not shown) of the peripheral device 700. That is, the GUI can control functions of the peripheral device 700.

The peripheral device 700 performs similar operations of the peripheral device 500 of FIG. 5 and the host computer 800 performs similar operations of the host apparatus 100 of the FIG. 1.

In the embodiment of FIG. 7, terminology information displayed at the operating panel unit (not shown) of the peripheral device 700 is identical to terminology information displayed at the GUI of the host computer 800. For example, a function of the peripheral device 700 to control a number of copies can be identically displayed at the operating panel unit (not shown) of the peripheral device 700 and the GUI of the host computer 800 as "number of copy."

However, in the present embodiment, the peripheral device 700 and the host computer 800 load the terminology information representing the functions of the peripheral device 700 from the terminology information server 900 to share the terminology information. That is, the peripheral device 700 and the host computer 800 request the terminology information server 900 to load the terminology information therefrom.

When the loading of the terminology information is requested, the peripheral device 700 and the host computer 800 may request terminology information suitable to a language of a country where the peripheral device 700 is being used. Accordingly, the peripheral device 700 and the host computer 800 may share identical terminology information with respect to countries where the peripheral device 700 is being used.

When the peripheral device 700 and the host computer 800 request loading of the terminology information, the terminology information server 900 loads the terminology information related to functions of the peripheral device 700 to the peripheral device 700 and the host computer 800.

As described above, the peripheral device 700 and the host computer 800 load terminology information from the terminology information server 900 according to the embodiment of FIG. 7. Accordingly, identical terminology information is displayed at both of the operating panel unit (not shown) of the peripheral device 700 and the GUI of the host computer 800 to represent identical functions of the peripheral device 700.

Also, if the terminology information is upgraded in the terminology information server 900, the upgraded terminology information may be loaded to both of the peripheral device 700 and the host computer 800 from the terminology information server 900.

The present general inventive concept may be embodied as executable code in computer readable media including storage media such as magnetic storage media (ROMs, RAMs, floppy disks, magnetic tapes, etc.) and optically readable media (CD-ROMs, DVDs, etc.).

As described above according to various embodiments of the present general inventive concept, a peripheral device and a host apparatus capable of sharing terminology, a method of sharing terminology and a terminology sharing system synchronize the terminologies used in the peripheral device and in the host computer with respect to the identical functions of the peripheral device. Therefore, the embodiments of present general inventive concept can prevent confusion of a user caused by different terminologies representing identical functions.

As described above according to various embodiments of the present general inventive concept, a peripheral device and a host apparatus can display identical terminology information according to languages of countries where the peripheral device is used when the peripheral device is manufactured in order to display terminology information as a predetermined language. Therefore, the embodiments of present general inventive concept can be effectively used throughout the world.

As described above according to various embodiments of the present general inventive concept, terminologies are defined according to functions of a peripheral device and the defined terminologies are translated. These operations are performed in one of the peripheral device and a host computer in various embodiments of the present general inventive concept, and then the terminologies are loaded to the other one thereof to use identical terminologies in both of the peripheral device and the host apparatus. Therefore, the embodiments of the present general inventive concept prevent doubly wasting costs for translation and doubly performing same operations for defining the terminologies and for translating the defined terminologies which were individually performed in the conventional peripheral device and the conventional host computer.

As described above according to various embodiments of the present general inventive concept, when terminology information is loaded from a terminology information server, a peripheral device and a host computer effectively upload upgraded terminology information from the terminology information server to the peripheral device and the host computer.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A host apparatus to share terminology information, comprising:
   a communication module to provide a communication interface between the host apparatus and an image forming apparatus;
   an information sharing unit to share terminology information via the communication interface with the image forming apparatus, the terminology information including terminologies defined according to each function of the image forming apparatus and explanation of the terminologies; and
   a user interface unit to display terminologies labeled in accordance with the shared terminology information and to physically operate the image forming apparatus according to the functions indicated by the labeled user controls,
   wherein the terminologies displayed at the user interface unit are the same as terminologies displayed at a display of the image forming apparatus.

2. The host apparatus of claim 1, further comprising:
   a controlling unit to request the image forming apparatus to load the terminology information from the image forming apparatus to the host apparatus, to control the communication module and the information sharing unit to share the terminology information loaded from the image forming apparatus, and to control the user interface unit to display the terminologies with the shared terminology information related to each of the plurality of functions.

3. The host apparatus of claim 1, wherein the information sharing unit stores the terminology information therein such that the image forming apparatus, upon requesting the information sharing unit to load the terminology information from the information sharing unit to the peripheral unit, stores the terminology information loaded from the information sharing unit.

4. A host apparatus that communicates with an image forming apparatus which displays an operation menu using predetermined terminology to control physical operations of the image forming apparatus, the host apparatus comprising:
   an information sharing unit to load the predetermined terminology from the image forming apparatus and to store the predetermined terminology; and
   an image forming apparatus driver unit to display a driver menu using the loaded terminology such that the driver menu uses identical terminology as that used in the operation menu of the image forming apparatus,
   wherein the predetermined terminology has assigned thereto indexes corresponding to fields of the driver menu, and
   wherein the terminologies displayed at the user interface unit are the same as terminologies displayed at a display of the image forming apparatus.

5. The host apparatus of claim 4, wherein the image forming apparatus driver arranges the predetermined terminology in the corresponding fields of the driver menu according to the indexes.

6. A host apparatus that communicates with an image forming apparatus which displays a menu to control physical operations of the image forming apparatus, the host apparatus comprising:
   a storage unit to store predetermined terminology information, the terminology information including terminologies defined according to each function of the image forming apparatus, explanation of the terminologies defined and terminology information position information;
   a GUI (graphic user interface) generating unit to generate a GUI to control the physical operations of the image forming apparatus, the generated GUI having displayed thereon terminologies labeled in accordance with the terminology information at positions thereof corresponding to the terminology information position information; and
   an information sharing unit to transmit the stored terminology information to the image forming apparatus such that the menu of the image forming apparatus is displayed in accordance therewith,
   wherein the terminologies displayed at the user interface unit are the same as terminologies displayed at a display of the image forming apparatus.

7. The host apparatus of claim 6, wherein the terminology information comprises both predetermined terminology items definitive of the respective operations of the image forming apparatus and the terminology position information associated with each of the predetermined terminology items, such that the GUI generating unit and the peripheral unit display the predetermined terminology items in the GUI and the menu, respectively, in an arrangement defined by the associated terminology position information.

8. An image forming device that communicates with a host apparatus which displays a graphic user interface (GUI) to control the image forming device, the image forming device comprising:
   an image forming unit to form an image;
   a storage unit to store predetermined terminology information descriptive of physical operations of the image forming unit that form the image, the terminology information including terminologies defined according to each function of the image forming device and explanation of the terminologies defined and terminology position information corresponding to terminologies to control the physical operations of the image forming unit;
   an operating panel unit to display a menu to control the image forming unit, the menu having displayed thereon the terminologies labeled in accordance with the terminology information at positions thereof corresponding to the predetermined terminology information position information; and
   an information sharing unit to transmit the predetermined terminology information to the host apparatus such that the GUI of the host apparatus is displayed with terminologies labeled with the transmitted terminology information in an arrangement defined by the terminology position information,
   wherein the terminologies displayed at the user interface unit are the same as terminologies displayed at a display of the image forming device.

9. An image forming device that communicates with a host apparatus which displays a driver menu to physically control the image forming device, the driver menu having terminologies labeled with respective predetermined terminology items corresponding to settings of the image forming device at positions thereon corresponding to terminology position information, the image forming device comprising:
   an image forming unit to form an image;
   an information sharing unit to load the predetermined terminology from the host apparatus and to store the loaded terminology; and an operating panel unit to generate and display an operation menu to physically control the image forming device, the displayed operation menu having terminologies labeled with the loaded predetermined terminology at positions thereof corresponding to the terminology position information such that the operation menu is labeled with identical terminology as the driver menu of the host apparatus, wherein the terminologies displayed at the user interface unit are the same as terminologies displayed at a display of the image forming device.

10. The image forming device of claim 9, wherein the information sharing unit loads the terminology position information corresponding to the loaded predetermined terminology from the host apparatus such that the operating panel unit labels the operation menu with the loaded predetermined terminology in an arrangement defined by the loaded terminology position information.

11. A method of sharing terminology information between a host apparatus and an image forming apparatus, the method comprising:
defining terminology information items indicative of respective functions of the image forming apparatus;
assigning terminology information indexes to respective terminology information items;
storing the defined terminology information items and the respectively assigned terminology information so as to be retrievable by both the host apparatus and the image forming apparatus;
generating a user interface of the host apparatus having regions identified by respective user interface indexes;
displaying upon request terminologies on the user interface, the terminologies labeled with the terminology information items at the regions in the user interface where the user interface indexes thereof match the terminology information indexes;
selecting one of the functions by selecting one of the terminologies labeled with a corresponding one of the terminology information items displayed in the user interface; and
requesting the image forming apparatus to perform the selected function,
wherein the terminologies displayed at the user interface unit are the same as terminologies displayed at a display of the image forming apparatus.

12. The method of claim 11, wherein in the storing of the terminology information comprises:
requesting at the host apparatus for the image forming apparatus to load the terminology information from the image forming apparatus to the host apparatus; and
storing the terminology information loaded from the image forming apparatus.

13. The method of claim 11, further comprising:
loading stored terminology information to the image forming apparatus to share the stored terminology information in response to a request from the image forming apparatus to load the stored terminology information.

14. The method of claim 11, wherein the image forming apparatus comprises one of a fax, a copier, a multifunctional device, and an image forming apparatus.

15. A method of controlling an image forming apparatus in a system including a host apparatus communicating with the image forming apparatus, the method comprising:
storing in one of the image forming apparatus and the host apparatus terminology information definitive of physical operations of the image forming apparatus, the terminology information including terminology information indexes associated with respective terminology information items;
transmitting the terminology information stored in the one of the image forming apparatus and the host apparatus to the other one thereof;
displaying first and second menus in the image forming apparatus and the host apparatus, respectively, each of the menus being labeled with the identical terminology information items at respective locations thereon where the terminology information indexes match the menu location information items; and
controlling the physical operations of the image forming apparatus using one of the displayed first and second menus,
wherein the terminologies displayed at the user interface unit are the same as terminologies displayed at a display of the image forming apparatus.

16. A terminology information sharing system, comprising:
an image forming apparatus having an operating panel unit to display terminology information related to physical functions of the image forming apparatus to operate the physical functions;
a host computer to provide a graphic user interface having an arrangement of controls identical to that of the operating panel unit and labeled with the terminology information related to the physical functions of the image forming apparatus as displayed at the operating panel unit to physically control the image forming apparatus; and
a terminology information server coupled to both the image forming apparatus and the host computer such that the terminology information may be loaded to a requesting one of the image forming apparatus and the host computer,
wherein the terminologies displayed at the user interface unit are the same as terminologies displayed at a display of the image forming apparatus.

17. The terminology information sharing system of claim 16, wherein the requesting one of the image forming apparatus and the host computer store the terminology information loaded from the terminology information server as a file, the image forming apparatus displays the stored terminology information according to corresponding functions at the operating panel unit after the terminology information is stored, and the host computer generates the graphic user interface to display the terminology information identically to the operating panel unit.

18. The terminology information sharing system of claim 16, wherein the image forming apparatus and the host computer request the terminology information server to load terminology information expressed in a language native to a country in which the image forming apparatus is being used.

19. A terminology information sharing system, comprising:
an image forming apparatus that performs one or more predetermined physical functions described by terminology information stored thereat and that includes an operating panel unit to display an operational menu to control the physical functions via terminologies labeled with the stored terminology information; and
a host apparatus communicating with the image forming apparatus to load the terminology information from the image forming apparatus and to display a driver menu to control the physical functions of the image forming apparatus via terminologies labeled with the loaded terminology information, the driver menu is displayed with identical terminology information as that of the operational menu of the image forming apparatus, wherein the terminologies displayed at the user interface unit are the same as terminologies displayed at a display of the image forming apparatus.

20. The terminology information sharing system of claim 19, wherein the terminology information comprises:

specified language corresponding to the predetermined functions to be displayed in the operational menu and the driver menu; and indexes assigned to the specified language and corresponding to regions of the operational menu and the driver menu at which to display the specified language.

21. A terminology information sharing system, comprising:

an image forming apparatus having an operating panel unit to display a menu to control physical operations of the image forming apparatus using first terminologies labeled with terminology information describing the physical operations of the image forming apparatus;

a host apparatus communicating with the image forming apparatus to display a graphic user interface (GUI) to control the physical operations of the image forming apparatus using second terminologies labeled with the terminology information; and an information sharing unit communicating with the host apparatus and the image forming apparatus to store shared terminology information therein and to transmit the shared terminology information to the image forming apparatus and the host apparatus to be used as the terminology information labeling the first and second terminologies of the menu and the GUI, respectively, wherein the terminologies displayed at the user interface unit are the same as terminologies displayed at a display of the image forming apparatus.

22. The terminology information sharing system of claim 21, wherein the information sharing unit is provided in the image forming apparatus and the terminology information labels the first terminologies.

23. The terminology information sharing system of claim 21, wherein the information sharing unit is provided in the host apparatus and the terminology information labels the second terminologies.

24. The terminology information sharing system of claim 21, wherein the information sharing unit comprises:

an external server to transmit the shared terminology information to the image forming apparatus and the host apparatus.

25. A computer readable non-transitory recording medium containing code that, when executed, performs a method of sharing terminology information, comprising:

sharing between a host apparatus and an image forming apparatus having an operating panel unit terminology information items descriptive of respective physical functions of the image forming apparatus;

assigning terminology information indexes to the respective terminology information items;

generating a user interface having regions identified by respective user interface indexes;

displaying upon request terminologies on the user interface labeled with the shared terminology information items at the regions of the user interface where the user interface indexes thereof match the terminology information indexes;

selecting one of the physical functions of the image forming apparatus by selecting one of the terminologies labeled with a corresponding one of the terminology information items displayed in the user interface; and requesting the image forming apparatus to perform the selected physical function in response to the selected terminologies displayed on the user interface, wherein the terminologies displayed at the user interface unit are the same as terminologies displayed at a display of the image forming apparatus.

26. A computer readable non-transitory recording medium containing code that, when executed, performs a method of controlling an image forming apparatus in a system including a host apparatus communicating with the image forming apparatus, the method comprising:

storing in one of the image forming apparatus and the host apparatus terminology information including terminology information items descriptive of physical operations of the image forming apparatus and terminology information indexes respectively associated with the terminology information items;

transmitting the terminology information stored in the one of the image forming apparatus and the host apparatus to the other one thereof;

displaying first and second menus in the image forming apparatus and the host apparatus, respectively, using the transmitted terminology information at positions thereof where the terminology information indexes match menu location information of the respective first and second menus; and controlling the physical operations of the image forming apparatus using one of the displayed first and second menus, wherein the terminologies displayed at the user interface unit are the same as terminologies displayed at a display of the image forming apparatus.

27. A method of controlling an image forming apparatus having an operating panel unit, the method comprising:

sharing stored terminology information having terminology information indexes, between a host apparatus and the image forming apparatus; and displaying terminologies labeled with the terminology information to control a physical function of the image forming apparatus via an interface of one of the host apparatus and the image forming apparatus which is in substantially the same arrangement as that of an interface on the other of the host apparatus and the image forming apparatus, the arrangement of both interfaces defined by indexes of locations on the corresponding interface and the terminology information indexes, wherein the terminologies displayed at the user interface unit are the same as terminologies displayed at a display of the image forming apparatus.

\* \* \* \* \*